(12) United States Patent
Liu et al.

(10) Patent No.: US 9,299,148 B2
(45) Date of Patent: Mar. 29, 2016

(54) METHOD AND SYSTEM FOR AUTOMATICALLY DETERMINING A LOCALIZER IN A SCOUT IMAGE

(71) Applicant: GE Medical Systems Global Technology Company, LLC, Waukesha, WI (US)

(72) Inventors: Ping Liu, Beijing (CN); Jiaqin Dong, Beijing (CN); Yilun Shi, Beijing (CN)

(73) Assignee: GE MEDICAL SYSTEMS GLOBAL TECHNOLOGY COMPANY, LLC, Waukesha, WI (US)

( * ) Notice: Subject to any disclaimer, the term of this patent is extended or adjusted under 35 U.S.C. 154(b) by 154 days.

(21) Appl. No.: 14/069,524

(22) Filed: Nov. 1, 2013

(65) Prior Publication Data

US 2014/0147026 A1 May 29, 2014

(30) Foreign Application Priority Data

Nov. 27, 2012 (CN) .......................... 2012 1 0489837

(51) Int. Cl.
*G06K 9/00* (2006.01)
*G06T 7/00* (2006.01)

(52) U.S. Cl.
CPC ........... *G06T 7/0032* (2013.01); *G06T 2200/04* (2013.01); *G06T 2207/10081* (2013.01); *G06T 2207/10088* (2013.01); *G06T 2207/30016* (2013.01)

(58) Field of Classification Search
None
See application file for complete search history.

(56) References Cited

U.S. PATENT DOCUMENTS

| | | | |
|---|---|---|---|
| 2009/0129650 A1* | 5/2009 | Hawkes et al. | 382/131 |
| 2010/0067764 A1 | 3/2010 | Lu | |
| 2011/0245656 A1* | 10/2011 | Bammer et al. | 600/411 |
| 2012/0114208 A1* | 5/2012 | Hirasawa et al. | 382/131 |
| 2012/0148131 A1* | 6/2012 | Couch et al. | 382/131 |

OTHER PUBLICATIONS

Thirion 1995 J. P. Thirion. Fast non-rigid matching of 3D medical image. Technical report, Research Report RR-2547, Epidure Project, INRIA Sophia, May 1995.
Thirion 1998 J. -P. Thirion. Image matching as a diffusion process: an analogy with Maxwell's demons. Medical Image Analysis, 2(3): 243-260, 1998.
Rueckert 1999 D. Rueckert, et al: "Nonrigid Registration Using Free-Form Deformations: Application to Breast MR Images", IEEE Trans. Med. Imag., vol. 18, No. 8, pp. 712-721, 1999.
Hajnal 2001 Joseph V. Hajnal, et al.: Medical Image Registration (Biomedical Engineering) ISBN-10: 0849300649.
Pluim 2003 Josien P. W. Pluim, et al: "Mutual-Information-Based Registration of Medical Images: A Survey", IEEE Trans. Med. Imag., vol. 22, No. 8, pp. 986-1004, 2003.
Teasdale 2009 Evelyn M Teasdale, et al.: Multidetector CT in Neuroimaging: An Atlas and Practical Guide. ISBN-10: 1904392687.

(Continued)

*Primary Examiner* — Weiwen Yang
(74) *Attorney, Agent, or Firm* — GE Global Patent Operation

(57) ABSTRACT

A method and system for automatically determining a localizer in a scout image. The method comprises obtaining a 3D model best matched to an object to be scanned and projecting a localizer in the best matched 3D model onto a scout image of the object to be scanned to obtain an optimal localizer. The system comprises an obtaining device for obtaining a 3D model best matched to an object to be scanned and a determining device for projecting a localizer in the best matched 3D model onto a scout image of the object to be scanned to obtain an optimal localizer.

18 Claims, 5 Drawing Sheets

(56) References Cited

OTHER PUBLICATIONS

Teasdale 2009 Evelyn M Teasdale, et al.: Multidetector CT in Neuroimaging: An Atlas and Practical Guide. Chapter 13, pp. 121-138, ISBN-10: 1904392687.

CT Teaching Manual: A Systematic Approach to CT Reading, M. Hofer,, The Journal of Nuclear Medicine, vol. 48, No. 3 Mar. 2007, p. 494.

Interactive Multigrid Refinement for Deformable Image Registration, Hindawi Publishing Corporation, BioMed Research International, vol. 2013, article ID 532936, 9 pages, dated Jun. 17, 2013.

Numerical Methods for Image Registration 2004, Part 1 Parametric Image Registration, pp. 25-44.

Protocols for Multislice CT, 2nd edition, VII Musculoskeletal, pp. 234-245.

* cited by examiner

Fig. 3
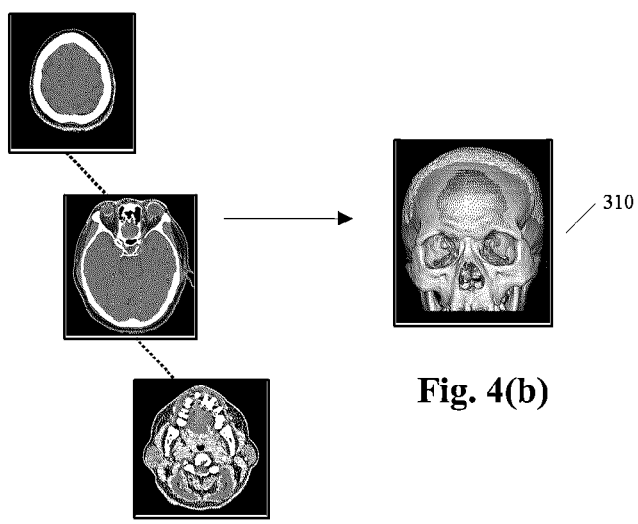
Fig. 4(b)
Fig. 4(a)
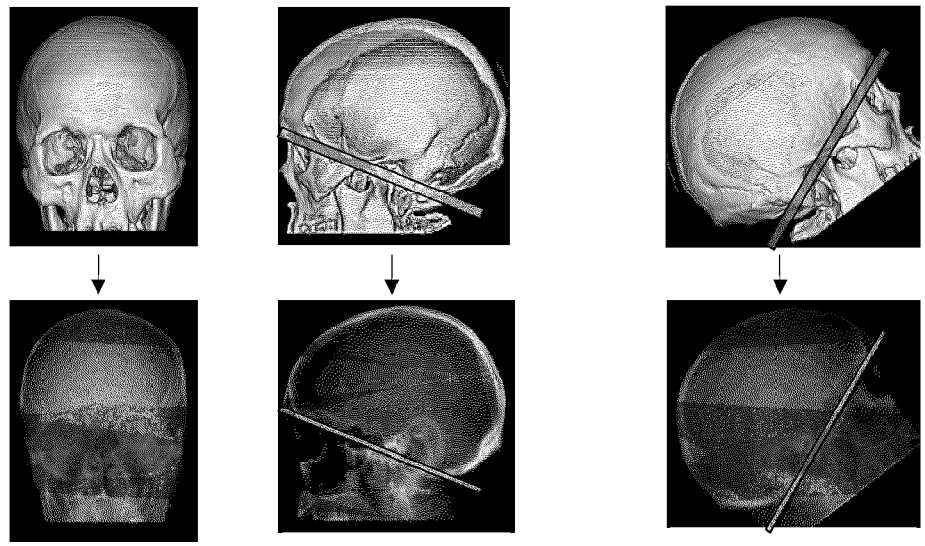
Fig. 5(a)　　　Fig. 5(b)　　　Fig. 5(c)

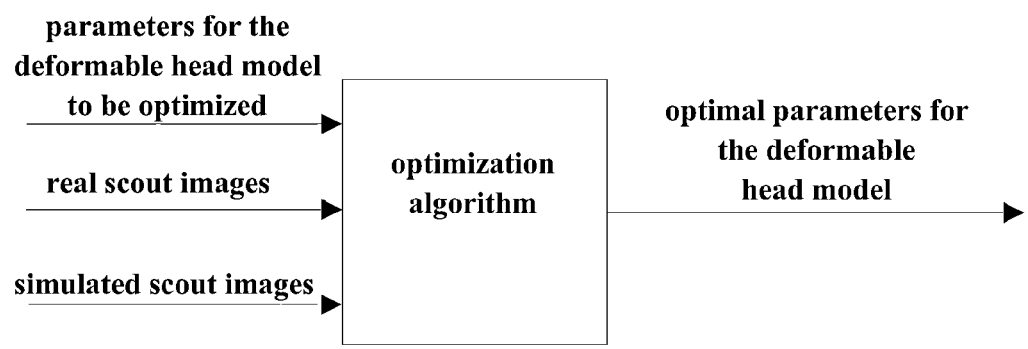
Fig. 7
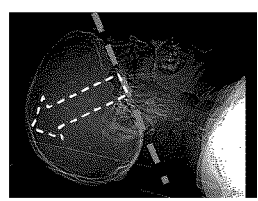 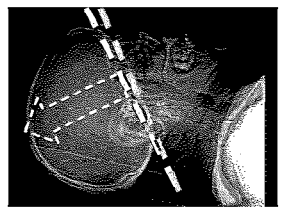 
Fig. 8(a)         Fig. 8(b)         Fig. 8(c)

METHOD AND SYSTEM FOR AUTOMATICALLY DETERMINING A LOCALIZER IN A SCOUT IMAGE

TECHNICAL FIELD

The present disclosure relates to the field of medical examinations, and in particular, to method and system for automatically determining a localizer in a scout image for medical examinations.

BACKGROUND ART

In the field of medical examinations, such as in a computerized tomography (CT) or nuclear magnetic resonance (MR) examination, a scan range normally needs to be determined. This can be achieved by acquiring a scout image of the object to be scanned and providing a suitable localizer therein. However, the current provision of a localizer is essentially achieved by manual operations of an operator, which is not only laborious and time-consuming, but also difficult to ensure precision of the location and angle of the localizer, such that it is difficult to obtain an accurate scan range.

The following takes a complete head CT scan as an example to illustrate the existing workflows.

For a complete head CT scan, current workflows are mainly dependent upon manual operations, as is illustrated in FIG. 1. At step S110, the patient is positioned on the table. At step S120, the table is manually adjusted so as to enable the laser line to cross the head of the patient, and the head pose of the patient is also manually adjusted such that the orbitomeatal baseline (OMBL) of the patient fits the laser line, or the CT gantry is manually tilted such that the laser line fits the OMBL of the patient. Be it manually adjusting the head pose of the patient so as to enable the OMBL of the patient to fit the laser line, or manually tilting the CT gantry so as to enable the laser line to fit the OMBL of the patient, said manual operation is not only laborious and time consuming, but also difficult to fulfill an accurate OMBL alignment. Therefore, repeated adjustment may be needed. This manual operation is generally called "pose adjusting".

After pose adjustment, a scout scan will be performed as shown by step S130, where the scan range of the scout scan is estimated. The scan range should at least cover the entire head range. After a scout image is acquired, at step S140, the user needs to manually adjust the location and angle of the OMBL based on the scout image. To be specific, the user clicks or drags the mouse to change the start location, end location, and angle of a scan group, and adjusts the scan width according to the head image. This manual operation is generally called "localizer adjusting".

If the patient's head moves after the pose adjustment but before the scout scan, the user needs to re-set the tilt angle of the CT gantry, or re-adjust the head pose of the patient.

At step S150, the user manually sets a scan range. FIG. 3 shows schematically a scan range. As shown in FIG. 3, the length of the scan range is from the OMBL denoted by broken lines on the right side to the head vertex denoted by broken lines on the left side, and the width thereof is the head width parallel to the OMBL.

After all key parameters (e.g., the location and angle of the OMBL, and the scan range) become proper, the head is scanned (e.g., an axial scan or a helical scan), as shown at step S160.

Current typical workflows for a complete head CT scan are subject to the following problems: manual alignment of the laser line or the scan plane to the OMBL is laborious and time consuming; manual alignment of the laser line or the scan plane to the OMBL may be inaccurate if the operator is not familiar with the operation; the OMBL angle is sometimes too inclined to the eyes, resulting in an unnecessary part of eyeballs being scanned; and the OMBL angle is sometimes too inclined to the cerebellum or is translated to the cerebellum, resulting in part of the brain tissue being missed, such that a repeated scan or complementary scan may be clinically needed.

Recently, there have been some researches on image registration based methods, which attempt to detect and locate the OMBL automatically. However, image registration is not suitable for indistinct scout images, such as scout images of the head. Scout images such as CT scout images include a huge volume of 3D information overlapped on a 2D plane, possibly lacking sharp and definite edges and outstanding feature points. Therefore, up to now, there is no appropriate image registration method successfully applicable to automatic detection and location of the OMBL in CT scout images.

Therefore, a method and system for automatically determining a localizer in scout images is needed.

SUMMARY OF THE INVENTION

To solve the abovementioned problems, the present disclosure provides a method and system for automatically determining a localizer in a scout image, which makes full use of the 3D information implicated in the 2D scout image to automatically detect and locate the localizer. The present invention is a fully automatic process after the scout scan in the complete scan protocol.

For example, in a complete head CT scan protocol, the present invention provides a method and system for automatically determining the OMBL, which is a fully automatic process.

The present disclosure provides a method for automatically determining a localizer in a scout image, comprising: an obtaining step for obtaining a 3D model best matched to an object to be scanned; and a determining step for projecting a localizer in the best matched 3D model onto a scout image of the object to be scanned so as to obtain an optimal localizer.

In a method according to one or more embodiments of the present invention, the obtaining step comprises: a calculating step for calculating a match error between a scout image of a 3D model corresponding to the object to be scanned and a scout image of the object to be scanned; and an adjusting step for adjusting the 3D model corresponding to the object to be scanned so as to minimize the match error, wherein when the match error is the minimal, the corresponding 3D model is the best matched model.

In a method according to one or more embodiments of the present invention, the 3D model corresponding to the object to be scanned is constructed in advance based on an average of image slices of multiple scan groups which are of a same race or area as the object to be scanned.

In a method according to one or more embodiments of the present invention, the adjusting step includes: a step of setting a set of parameters for adjusting the 3D model corresponding to the object to be scanned; and a step of optimizing the set of parameters via an optimization algorithm so as to minimize the match error.

In a method according to one or more embodiments of the present invention, the set of parameters include: model shape size parameters for changing a shape and/or size of the 3D model corresponding to the object to be scanned; model pose parameters for changing a pose of the 3D model corresponding to the object to be scanned; a special shape control points set for realizing a special shape of the 3D model corresponding to the object to be scanned; and/or translation parameters for translating the 3D model corresponding to the object to be scanned.

In a method according to one or more embodiments of the present invention, the optimization algorithm includes the Gauss-Newton method, the Levenberg-Marquardt method, or any other appropriate optimization algorithm.

A method according to one or more embodiments of the present invention further comprises setting a scan range according to said optimal localizer for a subsequent scan, such as an axial scan or a helical scan.

A method according to one or more embodiments of the present invention further comprises translating and/or rotating the optimal localizer according to needs and setting a scan range according to the translated and/or rotated localizer for a subsequent scan, such as an axial scan or a helical scan.

In a method according to one or more embodiments of the present invention, the object to be scanned has a definite bone structure, such as the head or the lumbar vertebra.

In a method according to one or more embodiments of the present invention, the localizer includes the orbitomeatal baseline (OMBL) and/or the Reid's baseline.

In a method according to one or more embodiments of the present invention, the scout image is a scout image for use in computerized tomography or nuclear magnetic resonance.

The present disclosure also provides a system for automatically determining a localizer in a scout image, comprising: an obtaining device for obtaining a 3D model best matched to an object to be scanned; and a determining device for projecting a localizer in the best matched 3D model onto a scout image of the object to be scanned so as to obtain an optimal localizer.

In a system according to one or more embodiments of the present invention, the obtaining device comprises: a calculating means for calculating a match error between a scout image of a 3D model corresponding to the object to be scanned and a scout image of the object to be scanned; and an adjusting means for adjusting the 3D model corresponding to the object to be scanned so as to minimize the match error, wherein when the match error is the minimal, the corresponding 3D model is the best matched model.

In a system according to one or more embodiments of the present invention, the 3D model corresponding to the object to be scanned is constructed in advance based on an average of image slices of multiple scan groups which are of a same race or area as the object to be scanned.

In a system according to one or more embodiments of the present invention, the adjusting means includes: a means for setting a set of parameters for adjusting the 3D model corresponding to the object to be scanned; and a means for optimizing the set of parameters via an optimization algorithm so as to minimize the match error.

In a system according to one or more embodiments of the present invention, the set of parameters include: model shape size parameters for changing a shape and/or size of the 3D model corresponding to the object to be scanned; model pose parameters for changing a pose of the 3D model corresponding to the object to be scanned; a special shape control points set for realizing a special shape of the 3D model corresponding to the object to be scanned; and/or translation parameters, for translating the 3D model corresponding to the object to be scanned.

In a system according to one or more embodiments of the present invention, the optimization algorithm includes the Gauss-Newton method, the Levenberg-Marquardt method, or any other appropriate optimization algorithm.

A system according to one or more embodiments of the present invention further comprises a means for setting a scan range according to said optimal localizer for a subsequent scan, such as an axial scan or a helical scan.

A system according to one or more embodiments of the present invention further comprises a means for translating and/or rotating the optimal localizer according to needs and setting a scan range according to the translated and/or rotated localizer for a subsequent scan, such as an axial scan or a helical scan.

In a system according to one or more embodiments of the present invention, the object to be scanned has a definite bone structure, such as the head or the lumbar vertebra.

In a system according to one or more embodiments of the present invention, the localizer includes the orbitomeatal baseline (OMBL) and/or the Reid's baseline.

In a system according to one or more embodiments of the present invention, the scout image is a scout image for use in computerized tomography or nuclear magnetic resonance.

The present invention further provides a computerized tomography system or nuclear magnetic resonance system comprising a system for automatically determining a localizer in a scout image.

Embodiments of the present invention possesses at least the following advantages: the fully automatic process can avoid time consuming and laborious manual operations, thereby simplifying the workflow of medical examinations and improving efficiency of medical examinations; the accuracy of the location and angle of the localizer is improved, such that medical examinations are endued with better performance; the scan of an unnecessary part is maximally avoided, thereby reducing the dose of X-rays; different work modes can be designed according to user operating habits so as to meet market and clinical needs.

BRIEF DESCRIPTION OF THE DRAWINGS

The present invention will be more apparent to those skilled in the art upon reading the following description of embodiments with reference to the accompanying drawings, in which:

FIG. 3 is a schematic diagram of a scan range;

FIGS. 4A and 4B show schematically a process of extracting a 3D skull model according to a series of CT axial scan images;

FIGS. 5A, 5B and 5C show schematically a process of simulation scout projections for certain angles on a 3D skull model according to an embodiment of the present invention;

FIG. 7 shows schematically the input and output of the optimization algorithm according to an embodiment of the present invention; and FIGS. 8A, 8B and 8C show schematically three work modes as per user preferences according to an embodiment of the present invention.

DETAILED DESCRIPTION OF THE INVENTION

Figure 1:
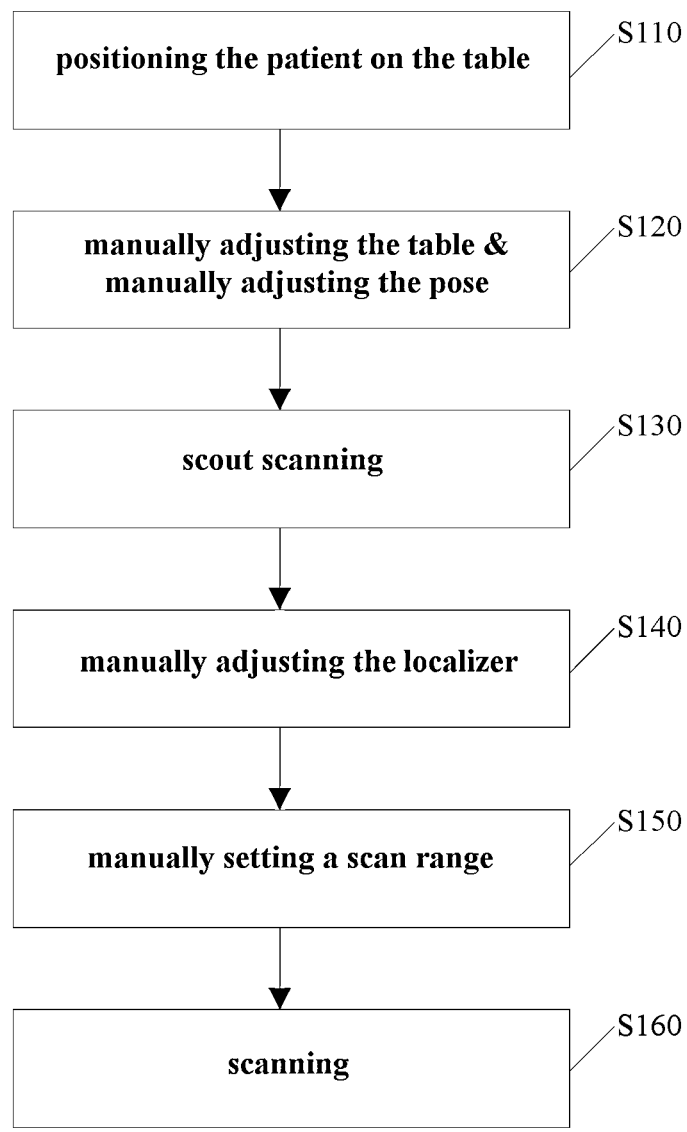
FIG. 1 is a schematic diagram of the current workflow for a complete head CT scan.

Embodiments of the present invention described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements. Reference in the specification to "one embodiment" or "an embodiment" of the invention means that a particular feature, structure, or characteristic described in connection with the embodiment is included in at least one embodiment of the invention. Thus, the appearances of the phrase "in one embodiment" in various places throughout the specification are not necessarily all referring to the same embodiment.

The present invention will be described in detail with an example of a head CT scan. However, it should be noted that the present invention is not limited to the head, but applicable to any tissue having a definite bone structure, such as the lumbar vertebrae. It should also be noted that the present invention is not limited to a CT scan, and is also useful in other applications such as MR.

The following shows a method for automatically detecting and locating a localizer such as the OMBL in a 2D head scout image in a head CT scan. It should be noted that the present invention is not limited to automatic detection and location of the OMBL, and is also applicable to detection and location of other localizers such as the Reid's baseline. The method can make full use of 3D information implicated in the 2D scout image, and is a fully automatic process after the scout scan but before an axial scan or a helical scan in a complete head CT scan protocol.

FIG. 1 is a schematic diagram of the current workflow for a complete head CT scan. As stated above, steps S120, S140 and S150 are all manual operations, which are not only laborious and time consuming, but also difficult to ensure precision of the location and angle of the OMBL.

Figure 2:
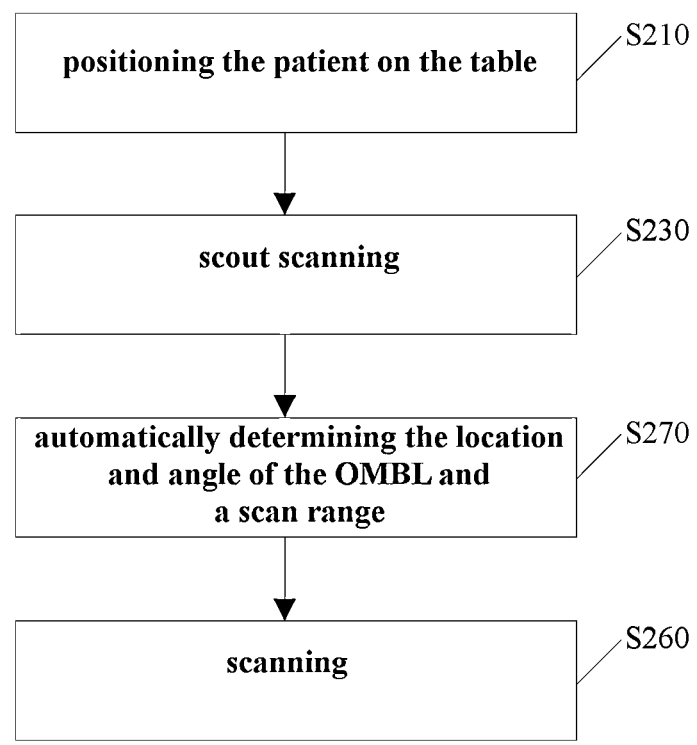
FIG. 2 is a schematic diagram of an improved workflow for a complete head CT scan according to an embodiment of the present invention.

FIG. 2 is a schematic diagram of an improved workflow for a complete head CT scan according to an embodiment of the present invention. A comparison between the workflows shown by FIGS. 1-2 will reveal that in the workflow according to an embodiment of the present invention, the manual operations represented by steps S120, S140, S150 in the existing workflow illustrated by FIG. 1 are replaced by a fully automatic process on the CT console as shown by step S270 in FIG. 2. At step S270, the location and angle of the OMBL and a scan range are automatically determined. To be specific, the manual pose adjusting, the manual localizer adjusting, and the manual scan range adjusting in the existing workflow are replaced by a process of automatically determining the location and angle of the OMBL and the scan range according to the workflow of the present invention. After being automatically determined according to the present invention, the location and angle of the OMBL and the scan range are automatically set in the head CT scan protocol for a subsequent scan, such as an axial scan or a helical scan.

Steps S210, S230, and S260 in FIG. 2 are identical to steps S110, S130, and S160 in FIG. 1, such that further elaboration on them is only unnecessary herein. After a real head scout image is acquired at step S230, a fully automatic process as shown by step S270 takes place, including automatically determining the location and angle of the OMBL and the scan range, and automatically setting the determined location and angle of the OMBL and the determined scan range in the head CT scan protocol for a subsequent scan, such as an axial scan or a helical scan.

In the method for automatically determining the OMBL according to the present invention, a 3D deformable head model can be used. The 3D deformable head model can be constructed in advance. Once successfully constructed, the 3D deformable head model can directly be put in clinical applications, and all that is needed is to automatically calculate the optimal model parameters by simply running the software for realizing the method of the present invention on the CT console so as to best match the shape and pose of the model to the shape and pose of a clinical case.

From a series of axial scan images resulted from complete head scans of previous cases, 3D skull model points can be extracted, as shown in FIGS. 4A and 4B. A threshold T is empirically set so as to segment pixels in every CT slice into two parts: bone and non-bone. FIG. 4A shows a series of CT axial scan images, while FIG. 4B shows a 3D skull model points cloud formed based on the series of CT axial scan images shown in FIG. 4A.

Taking into account that there are considerable shape differences between 3D deformable skull models of different human races, one model for each race or area may be constructed. For each type of model, corresponding average cases are employed. General differences within a type of model can be compensated by deformation of the model.

A set of special control points may be designed in the model in case of a special individual shape, which cannot be well covered by general deformation of the model. For example, two control points may be designed for cheekbones. Raising these two control points (neighboring 3D points will be weighted by distances to the control points and will also be raised) can cover unordinary high cheekbone cases.

After a 3D skull model is obtained, a simulation scout projection may be conducted on said 3D skull model using a simulation scout projection algorithm, such that a simulated scout image is produced for matching to a real scout image. Said simulation scout projection algorithm simulates a CT scout scan. The specific process of the simulation scout projection algorithm according to an embodiment of the present invention may be as follows.

In the three-dimensional coordinate system xyz, the center of the 3D model is supposedly located at the coordinate (x1, y1, z1), and a point source is supposedly at the coordinate (x2, y2, z2). The point source irradiates the 3D model vertically downward along the z-axis, such that the fan beam projection lines generated by the point source pass through the 3D model, thereby producing a simulated scout image on the xoy plane. According to different directions in which the fan beam projection lines generated by the point source pass through the 3D model, simulated scout images for different angles can be produced, for example, a simulated 0° or 90° scout image as shown in FIGS. 5A, 5B and 5C. Normally, a simulated 0° scout image is resulted from frontal projection, and a simulated 90° scout image from lateral projection. FIG. 5A shows the 0° simulation scout projection (i.e., frontal projection) obtained based on the 3D head model, FIG. 5B shows the 90° simulation scout projection (i.e., lateral projection) obtained based on the 3D head model, and FIG. 5C shows the simulation scout projection of any pose obtained based on the 3D head model.

It should be noted that simulation scout projections for various angles may be conducted on the 3D deformable head model so as to obtain simulated scout images for various angles. Then, the simulated scout images for various angles may be matched to real scout images of clinical cases for corresponding angles. Said various angles may be 0°, 90°, or any other random degree.

Upon successful construction of the 3D deformable head model, the accurate OMBL may be defined in the 3D deformable head model. FIGS. 5B and 5C illustrate that the OMBL defined in the model is projected onto a corresponding simulated scout image. When projecting the 3D head model best matched to a clinical case onto the 2D CT scout image, the simulated OMBL in this best matched 3D head model may also be mapped onto the 2D CT scout image, thereby obtaining the optimal OMBL.

In order to automatically determine a localizer in a scout image, the 3D deformable model may be deformed, rotated and/or translated to best match to a clinical case. To be specific, the 3D deformable model is projected onto a 2D plane through the simulation scout projection to produce a simulated scout image, which is matched to a real scout image. When shape and pose parameters best matched to the clinical case are acquired, the localizer in this best matched 3D model is projected onto the real scout image. Thereafter, parameters for subsequent scans are calculated, including the location and angle of the localizer, and the scan range.

In an embodiment according to the present invention, in order to automatically determine the OMBL in a CT scout image, the 3D deformable head model may be deformed, rotated and/or translated to best match to a clinical case. To be specific, the 3D deformable head model undergoes the simulation scout projection onto a 2D plane to produce a simulated scout image, which is matched to a CT scout image. When shape and pose parameters best matched to the clinical case are acquired, the OMBL in this best matched 3D head model is projected onto the CT scout image. Thereafter, parameters for subsequent CT scans are calculated, including the location and angle of the OMBL, and the scan range.

Next is an elaboration on the method for automatically determining the OMBL by optimizing the matching of the 3D deformable head model to a clinical case according to an embodiment of the present invention.

For a specific clinical case, model parameters can be changed, such that the shape, size, pose and/or special shape defined by control points, etc are changed, and/or the model is translated.

Figure 6:
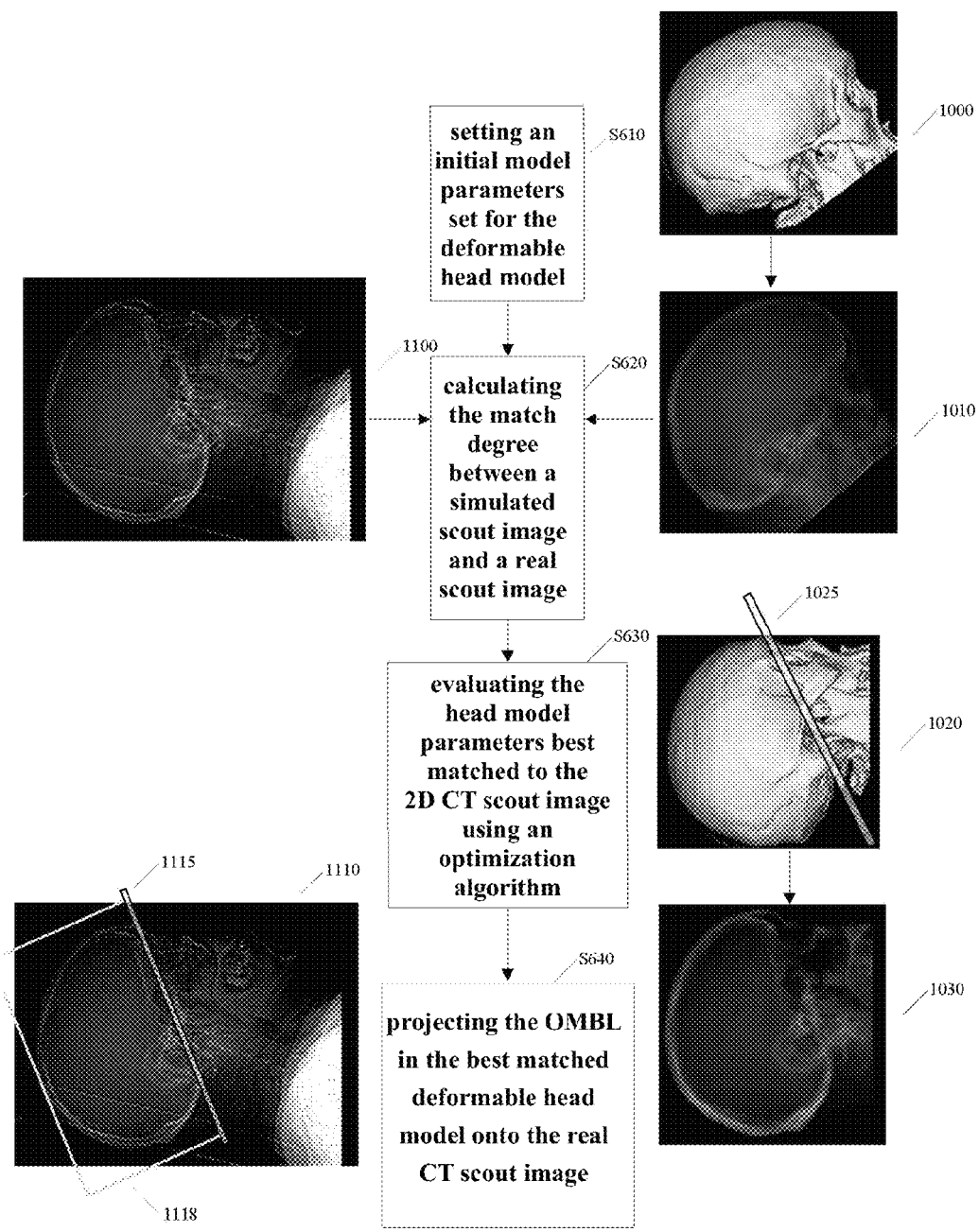
FIG. 6 shows schematically a process of automatically determining the OMBL in a CT scout image according to an embodiment of the present invention.

FIG. 6 shows schematically a method for automatically determining the OMBL in a CT scout image according to an embodiment of the present invention.

As stated above, upon successful construction of a 3D deformable head model, a set of model parameters may be adopted to change the shape and/or 3D pose of the 3D deformable head model, and/or to translate the 3D deformable head model. At the beginning of the method as depicted in FIG. 6, what is used is a set of initial model parameters expressed by a vector Xini, including:
 shape size parameters: Sx, Sy, Sz;
 a special shape control points set: Ss;
 model pose parameters: Rx, Ry, Rz; and/or
 translation parameters: Tx, Ty.

Among these parameters, shape size parameters are for changing the shape and/or size of the model to be optimized, model pose parameters are for changing the pose of the model to be optimized, the special shape control points set is for realizing a special shape of the model to be optimized, and translation parameters are for translating the model to be optimized.

The set of initial model parameters is empirically set to represent the average state of cases.

In one or more embodiments according to the present invention, the shape size parameters can be used to indicate the ratios for scaling the model to be optimized. For example, where Sx=0.7, Sy=0.7, and Sz=0.7, it means that the model to be optimized is scaled down to 70%.

In one or more embodiments according to the present invention, the model pose parameters can be used to denote the degrees for rotating the model to be optimized. For example, where Rx=30°, Ry=40°, and Rz=50°, it means that the model to be optimized is rotated 30 degrees clockwise about the x-axis, 40 degrees clockwise about the y-axis, and 50 degrees clockwise about the z-axis.

In one or more embodiments according to the present invention, the special shape control points set may include two control points for cheekbones. Raising these two control points (neighboring 3D points will be weighted by distances to the control points and will also be raised) can cover unordinary high cheekbone cases.

In one or more embodiments according to the present invention, the translation parameters can be used to denote the distances for translating the model to be optimized on the xoy plane. For example, where Tx=5 mm, and Ty=10 mm, it means that the model to be optimized is translated 5 mm along the positive direction of the x-axis, and 10 mm along the positive direction of the y-axis.

It should be understood that the model parameters are not limited to the shape size parameters (Sx, Sy, Sz), the special shape control points set (Ss), the model pose parameters (Rx, Ry, Rz) and the translation parameters (Tx, Ty) as provided above. For example, in one or more embodiments according to the present invention, the translation parameters can be Tx and Tz, indicating the distances for translating the model to be optimized on the xoz plane. Besides, the special shape control points set is not limited to the control points for cheekbones as mentioned above.

As stated above, simulation scout projections for various angles may be conducted on the 3D model so as to obtain simulated scout images for corresponding angles. Said various angles may be 0°, 90°, or any other random degree. Then, simulated scout images are matched to corresponding real scout images, the match error being E. According to an embodiment of the present invention, the match error E is minimized iteratively via an optimization algorithm to produce Emin, thereby obtaining a final model parameter set Xopt. The model shape and pose to which the final model parameter set Xopt corresponds best match the shape and pose of the real clinical case.

Next is an elaboration on the method as shown by FIG. 6.

At step S610, an initial model parameters set Xini for the 3D deformable head model is set empirically to represent the average state of cases. The initial model parameters set Xini includes: Sx, Sy, Sz; Ss; Rx, Ry, Rz; Tx, Ty. FIG. 6 also illustrates a 3D deformable head model 1000 at an initial pose and its corresponding simulated 90° scout image 1010 which is generated by performing the 90° simulation scout projection on the 3D deformable head model 1000.

At step S620, the match degree between the simulated 90° scout image 1010 and the real 90° scout image 1100 is calculated.

At step S630, an optimization algorithm is adopted to evaluate the head model parameters best matched to the 2D CT scout image. FIG. 7 shows schematically the input and output of the optimization algorithm according to an embodiment of the present invention. As shown in FIG. 7, the head model parameters to be optimized, real scout images, and corresponding simulated scout images serve as the input for the optimization algorithm, which optimizes the head model parameters to be optimized in an iterative manner to finally produce the head model parameters best matched to the 2D CT scout image. In an embodiment of the present invention, the head model parameters to be optimized, a real 90° scout image, and a simulated 90° scout image serve as the input for the optimization algorithm, which optimizes the head model parameters to be optimized in an iterative manner to finally produce the head model parameters best matched to the real 90° scout image. In an embodiment of the present invention, the head model parameters to be optimized, real 0°, 90° scout images, and simulated 0°, 90° scout images serve as the input for the optimization algorithm, which optimizes the head model parameters to be optimized in an iterative manner to finally produce the head model parameters best matched to the real clinical case. It could be understood that the input of the optimization algorithm is not limited to these examples. The optimization algorithm may be inputted with the head model parameters to be optimized, real scout images and simulated scout images for various angles, so as to obtain the head model parameters best matched to the real clinical case.

The Gauss-Newton method, the Levenberg-Marquardt method or any other appropriate optimization algorithm may be used to optimize the model parameters set in an iterative manner. By minimizing the match error E to produce Emin, a final model parameter set Xopt is obtained. The model shape and pose to which the final model parameter set Xopt corresponds best match the shape and pose of the real clinical case.

After the final model parameter set Xopt is found at step S630, at step S640, the simulated OMBL in the deformable head model to which the final model parameter set Xopt corresponds and that is best matched to the real scout image of the real clinical case is projected onto the CT scout image, thereby obtaining the optimal OMBL.

Projecting the OMBL of the final model onto the CT scout image results in the location and angle of the optimal OMBL. Once the location and angle of the optimal OMBL are determined, the width from the optimal OMBL to the head vertex can be determined, i.e., the scan range. As such, scan parameters (i.e., the location and angle of the OMBL, and the scan range) for subsequent complete head scans can be obtained. Next, the location and angle of the OMBL and the scan range are automatically set in a head CT scan protocol for a subsequent scan, such as an axial scan or a helical scan.

FIG. 6 also shows a 3D deformable head model 1020 best matched to the real scout image, a simulated 90° scout image 1030 of the best matched 3D deformable head model, and a real 90° scout image 1110. In the best matched 3D deformable head model 1020, the simulated OMBL 1025 is marked. The real 90° scout image 1110 shows the optimal OMBL 1115 that is obtained, and the scan range denoted by a rectangular block 1118.

To meet market and clinical requirements, different work modes may be designed according to operating habits of the user. FIGS. 8A, 8B and 8C show schematically three work modes designed as per user preferences according to an embodiment of the present invention.

FIG. 8A shows a mode of "Normal OMBL", in which the slice angle and anatomy structure are in line with the prior knowledge structure of doctors, but part of eyeballs will be scanned.

FIG. 8B shows a mode of "Eye avoidance 1", in which the OMBL is rotated by an appropriate angle above the eyes, such as 5°-10°, and the slice angle and anatomy structure are slightly different from the prior knowledge structure of doctors.

FIG. 8C shows a mode of "Eye avoidance 2", in which the OMBL is translated upward by a suitable distance, for example, 5 mm-10 mm, and the slice angle and anatomy structure are in line with the prior knowledge structure of doctors, but part of the cerebellum is not scanned.

"Eye Avoidance 1" is adopted in some hospitals. Under certain circumstances, "Eye avoidance 2" may be preferred.

In actual clinical applications, optional work modes are not limited to the three modes described above and represented according to FIGS. 8A, 8B and 8C. Different work modes may be designed for user selection upon actual needs.

The fully automatic process for automatically determining the OMBL in a head CT scout image according to an embodiment of the present invention can at least have the following advantages: avoiding time consuming and laborious manual operations, simplifying the workflow of a head CT scan, and thereby improving efficiency of a head CT scan; improving accuracy of the location and angle of the OMBL, such that the head CT scan is endued with better performance; maximally avoiding scan of unnecessary eyeball parts, and thereby reducing the dose of X-rays; and designing different work modes according to user operating habits so as to meet market and clinical needs.

While the present invention has been described with reference to specific embodiments, a skilled person will understand that the present invention is not limited to the embodiments. Many modifications and variations may be made to the present invention without departing from the scope of the present invention that is defined in the appending claims.

This written description uses examples to disclose the invention, including the best mode, and also to enable any person skilled in the art to practice the invention, including making and using any computing system or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for automatically determining a localizer in a scout image, the method comprising:
   obtaining a 3D model best matched to an object to be scanned;
   projecting a localizer in the best matched 3D model onto a scout image of the object to be scanned to obtain an optimal localizer; and
   setting a scan range according to the optimal localizer for a subsequent scan, such as an axial scan or a helical scan.

2. The method according to claim 1, wherein obtaining a 3D model best matched to an object to be scanned comprises:
   calculating a match error between a scout image of a 3D model corresponding to the object to be scanned and a scout image of the object to be scanned; and
   adjusting the 3D model corresponding to the object to be scanned to minimize the match error, wherein when the match error is minimal, the corresponding 3D model is the best matched 3D model.

3. The method according to claim 2, wherein the 3D model corresponding to the object to be scanned is constructed in advance based on an average of image slices of multiple scan groups of a same race or a same area as the object to be scanned.

4. The method according to claim 2, wherein adjusting the 3D model corresponding to the object to be scanned comprises:
   setting a set of parameters for adjusting the 3D model corresponding to the object to be scanned; and
   optimizing the set of parameters via an optimization algorithm to minimize the match error.

5. The method according to claim 4, wherein the set of parameters comprises at least one of:

model shape size parameters for changing a shape and/or size of the 3D model corresponding to the object to be scanned;

model pose parameters for changing a pose of the 3D model corresponding to the object to be scanned;

a special shape control points set for realizing a special shape of the 3D model corresponding to the object to be scanned; and translation parameters for translating the 3D model corresponding to the object to be scanned.

6. The method according to claim 4, wherein the optimization algorithm comprises at least one of a Gauss-Newton method, a Levenberg-Marquardt method, and other appropriate optimization algorithm.

7. The method according to claim 1, further comprising:
translating and/or rotating the optimal localizer according to needs; and
setting a scan range according to the translated and/or rotated localizer for a subsequent scan, such as an axial scan or a helical scan.

8. The method according to claim 1, wherein the object to be scanned has a definite bone structure, such as the head or the lumbar vertebra.

9. A system for automatically determining a localizer in a scout image, the system comprising:
a processor configured to:
obtain a 3D model best matched to an object to be scanned,
project a localizer in the best matched 3D model onto a scout image of the object to be scanned so as to obtain an optimal localizer, and
set a scan range according to the optimal localizer for a subsequent scan, such as an axial scan or a helical scan.

10. The system according to claim 9, wherein the processor is further configured to:
calculate a match error between a scout image of a 3D model corresponding to the object to be scanned and a scout image of the object to be scanned, and
adjust the 3D model corresponding to the object to be scanned to minimize the match error, wherein when the match error is minimized, the corresponding 3D model is the best matched model.

11. The system according to claim 10, wherein the 3D model corresponding to the object to be scanned is constructed in advance based on an average of image slices of multiple scan groups of a same race or a same area as the object to be scanned.

12. The system according to claim 10, wherein the processor is further configured to:
set a set of parameters for adjusting the 3D model corresponding to the object to be scanned; and
optimize the set of parameters via an optimization algorithm to minimize the match error.

13. The system according to claim 12, wherein the set of parameters comprises at least one of:
model shape size parameters for changing a shape and/or size of the 3D model corresponding to the object to be scanned;
model pose parameters for changing a pose of the 3D model corresponding to the object to be scanned;
a special shape control points set for realizing a special shape of the 3D model corresponding to the object to be scanned; and
translation parameters for translating the 3D model corresponding to the object to be scanned.

14. The system according to claim 11, wherein the optimization algorithm comprises at least one of a Gauss-Newton method, a Levenberg-Marquardt method, and other appropriate optimization algorithm.

15. The system according to claim 9, wherein the processor is further configured to translate and/or to rotate the optimal localizer according to needs, and to set a scan range according to the translated and/or rotated localizer for a subsequent scan, such as an axial scan or a helical scan.

16. The system according to claim 9, wherein the object to be scanned has a definite bone structure, such as a head or a lumbar vertebra.

17. The system according to claim 9, wherein the localizer comprises the orbitomeatal baseline (OMBL) and/or the Reid's baseline.

18. The system according to claim 9, wherein the scout image is a scout image for use in computerized tomography or nuclear magnetic resonance.

* * * * *